(No Model.) 2 Sheets—Sheet 1.

D. G. WEEMS.
ELECTRIC RAILWAY.

No. 406,806. Patented July 9, 1889.

WITNESSES:
B. J. Dashiell, Jr.
James G. Reich

INVENTOR
Daniel G. Weems
BY
A. H. Evans & Co
ATTORNEYS (No Model.) 2 Sheets—Sheet 2.

D. G. WEEMS.
ELECTRIC RAILWAY.

No. 406,806. Patented July 9, 1889.

WITNESSES:

INVENTOR
David G. Weems
BY
A. H. Evans & Co
ATTORNEYS

UNITED STATES PATENT OFFICE.

DAVID G. WEEMS, OF BALTIMORE, MARYLAND, ASSIGNOR TO THE ELECTRO-AUTOMATIC TRANSIT COMPANY, OF SAME PLACE.

ELECTRIC RAILWAY.

SPECIFICATION forming part of Letters Patent No. 406,806, dated July 9, 1889.

Application filed March 15, 1889. Serial No. 303,439. (No model.)

*To all whom it may concern:*

Be it known that I, DAVID G. WEEMS, a citizen of the United States, residing at Baltimore city, State of Maryland, have invented certain new and useful Improvements in Locomotives for Electric Railways, of which the following is a full and clear description, reference being had to the accompanying drawings, forming part of this specification, in which—

Figure 1:
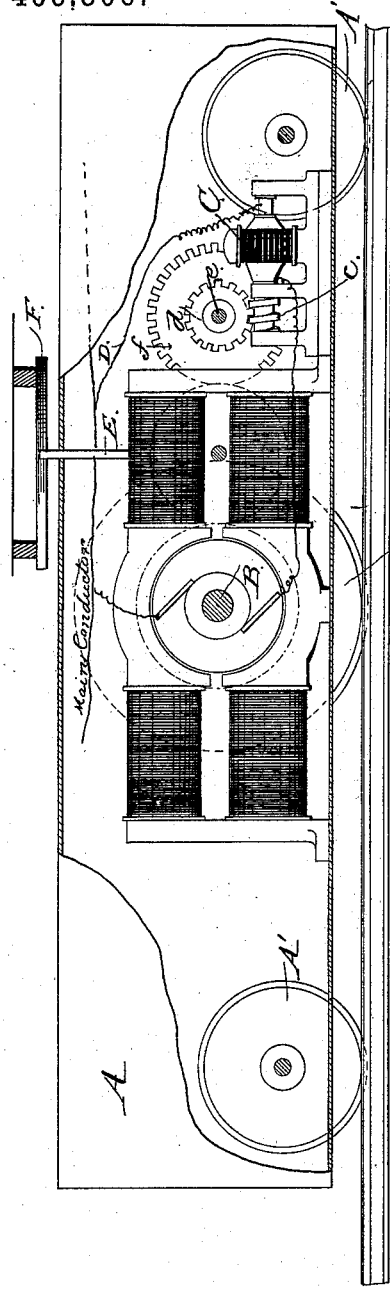
Figure 2:
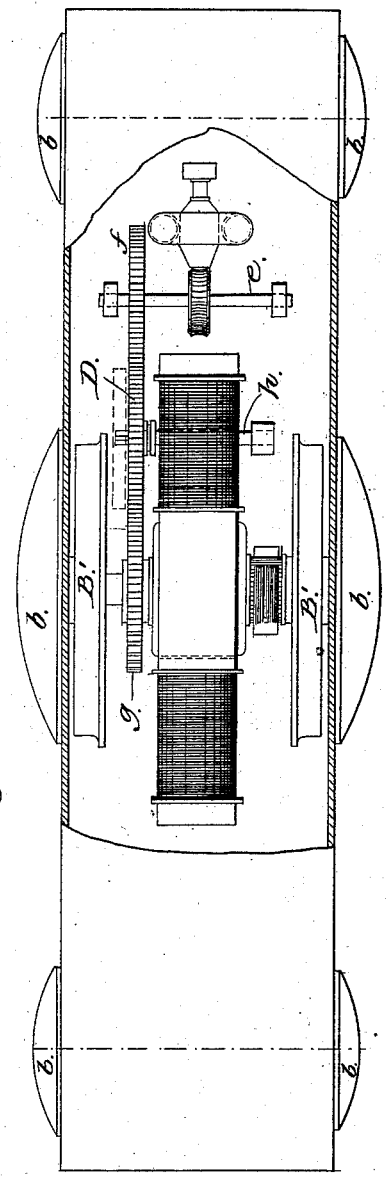
Figure 3:
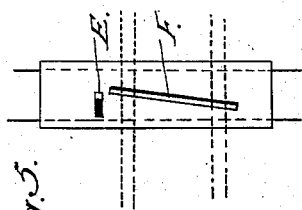
Figure 3:
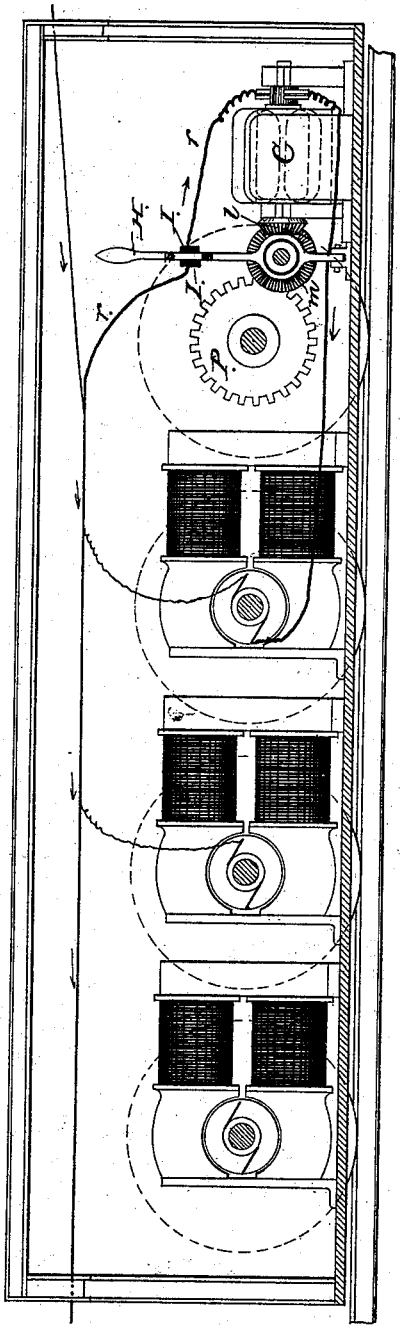
Figure 4:
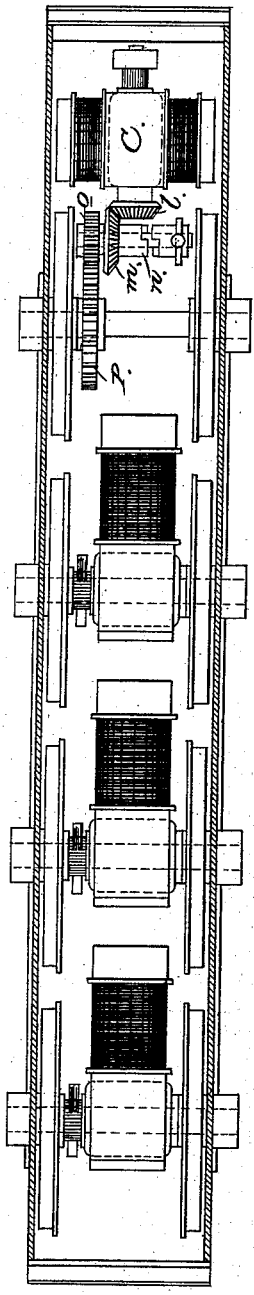

Figure 1 represents a side elevation of a car, partially in section, and showing the main and supplementary motors and the gearing for transmitting the power of the supplemental motor to the drive-wheels to effect a preliminary movement of said wheels. Fig. 2 is a plan view of the same, showing the top casing of the car broken away to disclose the motors and gears. Figs. 3 and 4 illustrate modified constructions of motors, gearing, &c. Fig. 5 is a detail to be referred to.

My present invention relates to certain new and useful improvements in railways which are operated by a current of electricity derived from any suitable source; and my invention consists, essentially, in providing the locomotive or car with one or more main motors and with supplemental motors in the main-motor circuit, and in connection with the main drive-wheels, whereby the power of the supplemental motor is exerted to effect a preliminary movement of the locomotive, which is afterward driven by the main motor, the current from the supplemental motor to the drive-wheels being cut off by a lever and trip, as I shall hereinafter fully describe and claim.

To enable others skilled in the art to make and use my invention, I will now describe the same and indicate the manner in which it is carried out.

In the said drawings, Figs. 1 and 2, the locomotive A is supported upon drive-wheels A', and may carry midway of its length one or more shafts on axles B, upon which the main motor or motors are mounted in any suitable manner. The axle or shaft B in Figs. 1 and 2 carries near its ends, inside the locomotive, the large drive-wheels B', and the outer ends of the axles or shafts B and the axles of the wheels A' are incased in semi-elliptical housings b, to protect the journals from dust and foreign matter and to permit the placing of said journals on the exterior of the locomotive or car, as more fully disclosed in an application filed by me January 30, 1889, Serial No. 298,119.

Actual experiments have demonstrated the fact that it is exceedingly difficult to generate and distribute sufficient energy to effect the first movements, or, in other words, to start the locomotive in motion; and therefore, to overcome these objections and to provide a simple means whereby the preliminary movements may be imparted to the locomotive, I secure in or to the locomotive a supplemental motor C, which may be of any appropriate design and strength, and which is in electric connection with the main current by means of a branch wire or conductor D, as shown. The supplemental motor carries a worm $c$, which meshes with and drives a pinion $d$ on a shaft $e$, which carries, also, a large gear $f$.

The axle or shaft B carries a gear-wheel $g$, and a shaft $h$, intermediate the shafts B and $e$, carries a shifting-gear D, which is operated by any well-known form of clutch mechanism, by which the gear D may be thrown into and out of connection with the gears $f$ and $g$, to connect or disconnect the supplemental motor with the driving-wheels.

In connection with the clutch mechanism for shifting the gear D, I employ a lever E, which connects with the clutch in any well-known manner, and which extends upwardly above the car, where its upper end may be engaged and tripped by a fixed inclined or other stop or trip F, such as shown in Figs. 1 and 5, whereby the lever is automatically moved by the stop to throw the gear D out of engagement with the gears $g$ and $f$ when the first revolutions of the driving-wheels are obtained. From this description it will be seen that when the gears are in mesh and the current conducted to the supplemental and main motors, as shown in Figs. 1 and 3, the revolution of the supplemental motor through the gears $f$, D, and $g$ tends to impart a preliminary movement to one or more of the main driving-wheels. As soon as the driving-wheel commences its revolution, the power of the main motor causes the locomotive to move forward at a speed which is regulated by the power of the main current in any well-known manner. The only purpose of the supplemental motor is to overcome the traction of the driving-wheels and to cause said wheels to begin their rotation, the power to drive the locomotive being derived wholly from the main motor.

In Figs. 3 and 4 I illustrate a modified arrangement of main and supplemental motors; but the objects to be obtained in this case and the operations of the several parts are very similar to those previously described. However, in Figs. 3 and 4 the supplemental motor C is provided with a bevel-pinion $l$, which meshes with and drives a bevel-gear $m$, carried by a clutch-sleeve $n$, which also is provided with a gear $o$, which meshes with and drives another gear $p$ on the shaft of one of the drive-wheels.

The lever H in Figs. 3 and 4 is pivoted at its lower end to the car, and it has a clutch-ring which engages the clutch-sleeve, so that when the lever is moved (which in this case may be done by hand) the gear $m$ is thrown out of engagement with its pinion. If desired, the upper portion of the lever may move between contact-plates I, (shown in Fig. 3,) to one of which plates the branch wire or conductor $r$ leads, the other plate being connected with the end of said wire or conductor which leads to the supplemental motor, and from whence it is carried in any suitable manner to the shaft or axle of one or more of the main drive-wheels. From this description it is manifest that when the main current is turned on a portion of it passes through the wire or conductor $r$ and the contact-plates I to the supplemental motor, which, being thereby set in motion, operates through the gearing before described to start the main drive-wheels in motion. The locomotive being thus set in motion, the lever H is moved out of contact with the plates I, thereby cutting off the current to the supplemental motor and disconnecting the gearing.

Having thus described my invention, what I claim as new, and desire to secure by Letters Patent, is—

1. In electric railways, a locomotive having a motor operated by the main current and a supplemental motor in the main-motor circuit for effecting a preliminary movement of the driving-wheels of the locomotive.

2. In electric railways, a locomotive having a main motor operated by the main current, a supplemental motor in the main circuit, and gearing between the supplemental motor and driving-wheels, whereby a preliminary movement of said wheels is effected.

3. In electric railways, a locomotive having a main motor operated by the main current, a supplemental motor carried by said locomotive and operated by said current, gearing between said supplemental motor and the driving-wheels, and a shifting-lever for disconnecting the gearing and cutting off the current from the supplemental motor, substantially as described.

4. In electric railways, a locomotive having a main motor operated by the main current, a supplemental motor carried by the locomotive and operated by said current, gearing connecting the supplemental motor with the drive-wheels of the locomotive, and a trip-lever and clutch mechanism for connecting and disconnecting the gearing, substantially as described.

5. In electric railways, the combination of a locomotive having a main motor for driving it, a supplemental motor on the locomotive for effecting a preliminary movement of its drive-wheels, gearing between the supplemental motor and drive-wheels, a shifting-lever for connecting and disconnecting the gearing, and fixed obstructions for tripping the lever and disconnecting the gearing, whereby the power of the supplemental motor is removed from the drive-wheels, substantially as described.

DAVID G. WEEMS.

Witnesses:
WM. M. PEGRAM,
JAMES G. REICH.